United States Patent
Hubbard

(10) Patent No.: US 7,509,405 B2
(45) Date of Patent: Mar. 24, 2009

(54) METHOD AND APPARATUS FOR INFERRING TOPOLOGY OF A NETWORK

(75) Inventor: Eric D. Hubbard, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 877 days.

(21) Appl. No.: 10/060,633

(22) Filed: Jan. 30, 2002

(65) Prior Publication Data

US 2003/0145078 A1    Jul. 31, 2003

(51) Int. Cl.
    *G06F 15/16*     (2006.01)
    *G06F 15/173*     (2006.01)
    *G06F 13/28*     (2006.01)

(52) U.S. Cl. ............ 709/223; 709/252; 709/253; 711/114

(58) Field of Classification Search ......... 709/223, 709/224, 252, 253; 370/254, 255, 257, 258; 711/114; 710/114
See application file for complete search history.

(56) References Cited

U.S. PATENT DOCUMENTS

| | | | | |
|---|---|---|---|---|
| 6,606,630 | B1* | 8/2003 | Gunlock | 707/100 |
| 6,671,776 | B1* | 12/2003 | DeKoning | 711/114 |
| 6,754,718 | B1* | 6/2004 | Dobberpuhl et al. | 709/250 |
| 6,839,747 | B1* | 1/2005 | Blumenau et al. | 709/223 |
| 6,845,395 | B1* | 1/2005 | Blumenau et al. | 709/223 |
| 6,917,970 | B2* | 7/2005 | Jay et al. | 709/220 |
| 6,920,494 | B2* | 7/2005 | Heitman et al. | 709/223 |
| 6,947,939 | B2* | 9/2005 | Fujibayashi et al. | 707/10 |
| 6,952,734 | B1* | 10/2005 | Gunlock et al. | 709/227 |
| 7,103,653 | B2* | 9/2006 | Iwatani | 709/223 |
| 7,171,624 | B2* | 1/2007 | Baldwin et al. | 715/734 |
| 7,296,099 | B2* | 11/2007 | Davison | 710/15 |
| 7,328,260 | B1* | 2/2008 | Muthiyan et al. | 709/224 |
| 7,430,593 | B2* | 9/2008 | Baldwin et al. | 709/223 |
| 7,457,846 | B2* | 11/2008 | Baldwin et al. | 709/217 |

FOREIGN PATENT DOCUMENTS

EP      1 115 225 A2     7/2001

OTHER PUBLICATIONS http://data.fibrechannel-europe.com/technology/whitepapers, 3 pages.
http://data.fibrechannel-europe.com/magazine/articles, 2 pages.
Vixel, Fibre Channel Switch Interoperability Standards, 3 pages.

* cited by examiner

*Primary Examiner*—Douglas B Blair

(57) ABSTRACT

Network topology is inferred by (a) determining which non-interconnect devices are visible to each adapter in the network; (b) determining sets of adapters having visibility to identical sets of non-interconnect devices; (c) for each set of adapters having more than one adapter, associating an interconnect device to the set and assigning links to the associated interconnect device from the adapters; (d) obtaining a list of non-interconnect devices in the network excluding non-interconnect devices already having satisfied visibilities; (e) for each visible non-interconnect device in the list of all non-interconnect devices, finding an adapter not already linked to the non-interconnect device having visibility to the non-interconnect device, and assigning a link between the non-interconnect device and an interconnect device assigned to the found adapter or directly between the found adapter and the non-interconnect device; and (f) iterating steps (d) and (e) until visibility of each adapter is satisfied.

30 Claims, 7 Drawing Sheets

METHOD AND APPARATUS FOR INFERRING TOPOLOGY OF A NETWORK

FIELD OF THE INVENTION

The present invention relates to computer network topology, and more particularly to methods and apparatus for determining computer network topologies, and especially storage area network topologies, in installations in which documentation is incomplete or unavailable.

BACKGROUND OF THE INVENTION

A storage area network is a high-speed, high-bandwidth inter-server network utilizing integrated hardware (usually fibre channel) and software to provide a robust, high-speed storage backbone. A SAN enables clusters of servers to share storage arrays with exclusive data access or to share data on common storage devices, depending on the SAN topology. SAN networks are useful, for example, in fully networked enterprises that require storage of substantial amounts of information collected on each customer and each transaction. Storage area networks (SANs) offer very high-speed, high-availability pools of storage that can be shared throughout an enterprise, yet managed through simplified operations.

Topology mapping is an important feature of SAN management software. To perform topology mapping, SAN management software seeks to discover all devices and connections. In one known implementation, the software must collect sufficient information to represent detailed properties of the connections. Among the information required are exact port numbers and port type of a switch to which a particular device is connected. This discovery is usually performed using communication paths such as SNMP over IP other than the paths used for storage and retrieval of data. However, some network managing systems do probe for this information over the storage and retrieval communication paths. In one configuration, connectivity devices such as switches are queried by the management software for information that is interpreted to identify the network topology. However, hubs do not provide complete management information and may not appear to the visualization software. Thus, inferred topology maps may not be truly representative, hindering effective management of the SAN. Although hub manufacturers may, in the future, provide complete connection information, direct manual user intervention is required to determine a complete SAN topology in at least one known management system. The management system is required to record information from the manual intervention to ensure that users are not required to repeat this intervention should the topology of the network need to be inferred in the future.

SUMMARY OF THE INVENTION

One aspect of the present invention therefore provides a method for inferring topology in a network, the method including steps of: (a) determining which non-interconnect devices are visible to each adapter in the network; (b) determining sets of adapters having visibility to identical sets of non-interconnect devices; (c) for each set of the sets of adapters that has more than one adapter, associating an interconnect device to the set having more than one adapter and assigning links to the associated interconnect device from the more than one adapter; (d) obtaining a list of non-interconnect devices in the network excluding non-interconnect devices already having satisfied visibilities; (e) for each visible non-interconnect device in the list of all non-interconnect devices, finding an adapter not already linked to the non-interconnect device that has visibility to the non-interconnect device, and assigning a link between the non-interconnect device and an interconnect device assigned to the found adapter or directly between the found adapter and the non-interconnect device; and (f) iterating steps (d) and (e) until visibility of each adapter is satisfied.

Another aspect of the present invention provides a method for inferring topology in a network, the method including steps of: (a) determining which non-interconnect devices are visible to each adapter in the network; (b) determining sets of adapters having visibility to identical sets of non-interconnect devices; (c) for each set of the sets of adapters that consists of a single adapter having visibility to more than one non-interconnect device, associating an interconnect device to the single adapter and assigning a link from the single adapter to the associated interconnect device; (d) obtaining a list of non-interconnect devices in the network excluding non-interconnect devices already having satisfied visibilities; (e) for each visible non-interconnect device in the list of all non-interconnect devices, finding an adapter not already linked to the non-interconnect device that has visibility to the non-interconnect device, and assigning a link between the non-interconnect device and an interconnect device assigned to the found adapter or directly between the found adapter and the non-interconnect device; and (f) iterating steps (d) and (e) until visibility of each adapter is satisfied.

Another aspect of the present invention provides a computing apparatus for inferring topology in a network having interconnected adapters, interconnect devices, and non-interconnect devices. The apparatus has a processor and a memory, and is configured to: (a) determine which non-interconnect devices are visible to each adapter in the network; (b) determine sets of adapters having visibility to identical sets of the non-interconnect devices; (c) for each set of the sets of adapters that has more than one adapter, associate an interconnect device to the set having more than one adapter and assign links to the associated interconnect device from the more than one adapter; (d) obtain a list of non-interconnect devices in the network excluding non-interconnect devices already having satisfied visibilities; (e) for each visible non-interconnect device in the list of all non-interconnect devices, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

Yet another aspect of the present invention provides a computing apparatus for inferring topology in a network having interconnected adapters, interconnect devices, and non-interconnect devices. The apparatus has a processor and a memory, and is configured to: (a) determine which non-interconnect devices are visible to each adapter in the network; (b) determine sets of adapters having visibility to identical sets of non-interconnect devices; (c) for each set of the sets of adapters that consists of a single adapter having visibility to more than one non-interconnect device, associate an interconnect device to the single adapter and assign a link from the single adapter to the associated interconnect device; (d) obtain a list of non-interconnect devices in the network excluding non-interconnect devices already having satisfied visibilities; (e) for each visible non-interconnect device in the list of all non-interconnect devices, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

Still another aspect of the present invention provides a machine readable medium or media having recorded thereon instructions configured to instruct a computing apparatus having a processor and a memory to: (a) determine which non-interconnect devices are visible to each adapter in the network; (b) determine sets of adapters having visibility to identical sets of the non-interconnect devices; (c) for each set of the sets of adapters that has more than one adapter, associate an interconnect device to the set having more than one adapter and assign links to the associated interconnect device from the more than one adapter; (d) obtain a list of non-interconnect devices in the network excluding non-interconnect devices already having satisfied visibilities; (e) for each visible non-interconnect device in the list of all non-interconnect devices, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

Yet another aspect of the present invention provides a machine readable medium or media having recorded thereon instructions configured to instruct a computing apparatus having a processor and a memory to: A machine readable medium or media having recorded thereon instructions configured to instruct a computing apparatus having a processor and an operatively coupled memory to: (a) determine which non-interconnect devices are visible to each adapter in the network; (b) determine sets of adapters having visibility to identical sets of non-interconnect devices; (c) for each set of the sets of adapters that consists of a single adapter having visibility to more than one non-interconnect device, associate an interconnect device to the single adapter and assign a link from the single adapter to the associated interconnect device; (d) obtain a list of non-interconnect devices in the network excluding non-interconnect devices already having satisfied visibilities; (e) for each visible non-interconnect device in the list of all non-interconnect devices, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

Yet another aspect of the present invention provides a computing apparatus for inferring topology in a network having interconnected adapters, interconnect devices, and non-interconnect devices. The apparatus includes: (a) means for determining which non-interconnect devices are visible to each adapter in the network; (b) means for determining sets of adapters having visibility to identical sets of the non-interconnect devices; (c) means for associating an interconnect device to the set having more than one adapter and for assigning links to the associated interconnect device from the more than one adapter for each set of the sets of adapters that has more than one adapter; (d) means for obtaining a list of non-interconnect devices in the network excluding non-interconnect devices already having satisfied visibilities; (e) means for finding an adapter not already linked to the non-interconnect device that has visibility to the non-interconnect device, and for assigning a link between the non-interconnect device and an interconnect device assigned to the found adapter or directly between the found adapter and the non-interconnect device, for each visible non-interconnect device in the list of all non-interconnect devices, and (f) means for iterating functions performed by means (d) and (e) until visibility of each adapter is satisfied.

Yet another aspect of the present invention provides a computing apparatus for inferring topology in a network having interconnected adapters, interconnect devices, and non-interconnect devices. The apparatus includes: (a) means for determining which non-interconnect devices are visible to each adapter in the network; (b) means for determining sets of adapters having visibility to identical sets of non-interconnect devices; (c) means for associating an interconnect device to the single adapter and for assigning a link from the single adapter to the associated interconnect device, for each set of the sets of adapters that consists of a single adapter having visibility to more than one non-interconnect device; (d) means for obtaining a list of non-interconnect devices in the network excluding non-interconnect devices already having satisfied visibilities; (e) means for finding an adapter not already linked to the non-interconnect device that has visibility to the non-interconnect device, and for assigning a link between the non-interconnect device and an interconnect device assigned to the found adapter or directly between the found adapter and the non-interconnect device, for each visible non-interconnect device in the list of all non-interconnect devices; and (f) means for iterating functions performed by means (d) and (e) until visibility of each adapter is satisfied.

Configurations of the present invention are useful in inferring the topology of a network, such as a storage area network, for which limited or no pre-existing topology information is available. This information can be utilized, for example, by a SAN management system to control a storage area network, or it may be displayed for other purposes, such as for network troubleshooting. Moreover, some configurations of the present invention permit network configurations to be inferred without requiring users to manually enter information about the network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
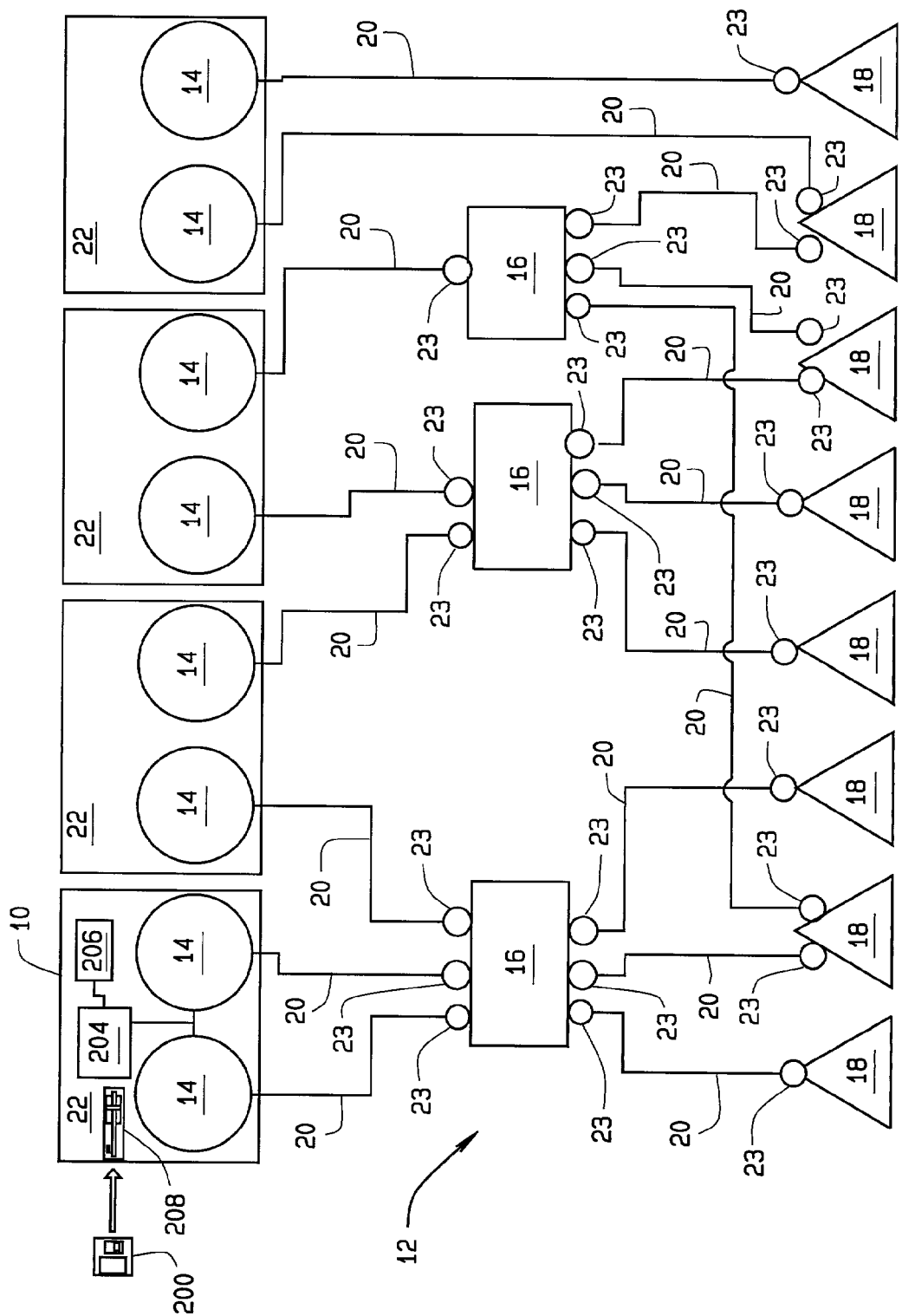
FIG. 1 is a block diagram of a network, such as a storage area network, including one configured of a computing apparatus or network controller of the present invention.

The following description of the preferred embodiment(s) is merely exemplary in nature and is in no way intended to limit the invention, its application, or uses.

As used herein, a "dumb" host bus adapter (HBA) is able to respond to queries requesting an identification of non-interconnect devices with which it can communicate. A "smart" host bus adapter (HBA) can do the same, but also makes available topology information, specifically, an identification of interconnect devices to which it is connected. When used in a storage area network (SAN), the interconnect devices may be, for example, hubs, switches, cables, or busses. Dumb HBAs may be limited to identifying particular storage devices as non-interconnect devices, but they will be able to identify each by serial number or other unique identification within the network.

Also as used herein, a "port" on an electronic device refers to an electrical connection configured for connection thereto by an electrical cable. A "link," as the term is used herein, refers to a representation of a cable in a memory of a controller or computing apparatus. Also as used herein, an "interconnect device" refers to an electronic switch, a hub, a cable, or other device in a network that provides a path for communication between other devices. Switches and hubs may have multiple input ports and/or multiple output ports. Cables may be considered as special "interconnect devices" in that have only two ports, either of which may be used as an input port, wherein the other port becomes an output port.

As used herein, a "storage device" refers to a device configured to store and to recall data. A storage device on a storage area network (SAN) may have one or two ports. A "host bus adapter" or "HBA" refers to a controller that resides in a computer or computing apparatus and that is configured to couple communications to and from the computer to other devices on a SAN. Although known HBAs have only one port, configurations in which HBAs have more than one port are not excluded.

When all unconnected HBAs have been checked, execution continues by constructing 38 a "filtered" list of HBAs 14 that include all HBAs 14 in SAN 12 except those "already connected." An "already connected" HBA 14 is either a "connected HBA" as in step 28 or an unconnected HBA 14 for which a link was assigned at 34 (and which is now thus an "already connected" HBA). Next, for each HBA 14 in the filtered list of HBAs, sets of HBAs having identical sets of visible storage devices 18 are determined 40. These sets may contain a plurality of HBAs 14, or, for an HBA having a set of visible storage devices different from all other HBAs in the filtered list, only one HBA.

For each set of two or more HBAs 14 having the same visible storage devices, a new hub 16 is associated with the set of HBAs and links are assigned 42 to the new hub from the HBAs in the set. More particularly, in one configuration, an InterconnectDevice representation is created in a memory of SAN manager 10 having sufficient Port represented on one "side" of the InterconnectDevice to represent cable connections between each HBA 14 of the set of HBAs and the InterconnectDevice, and sufficient Ports on the other "side" to represent cable connections between each storage device 18 visible to the set of HBAs 14 and the InterconnectDevice. By "assigning links" between HBAs 14 of the set and hub 16, what is meant in this configuration is that a representation of a cable interconnection between the HBAs 14 of the set and the InterconnectDevice is stored in the memory of SAN manager 10. In the case of a set consisting of a single HBA 14 seeing more than one storage device, a new hub 16 is associated with the single HBA and a link is assigned from the HBA to the new hub.

Next, a list of all storage devices 18 included in network 12 is obtained 44. If reliable topology information (for example, the pre-existing topology information at step 26) is available to SAN manager 10 other than that which had to be inferred, storage devices that are already associated with a hub are excluded from this list. For each storage device 18 in the filtered list, an HBA 14 is found 46 that has visibility to the storage device. A link is assigned between the storage device 18 under consideration and a hub 16 already associated with the found HBA 14, or if there is no hub 16 associated with the found HBA 14, a link is assigned directly between the found HBA and the storage device 18. (In one configuration, pre-existing topology information is also used to find ports 23 linked to HBAs 14 from which storage device 18 is visible.)

In the following portion of description, a configuration is described in which network 12 is a SAN, adapters 14 are HBAs, interconnect devices 16 are hubs, and non-interconnect devices 18 are storage devices. Although more specific terminology applicable to SANs is used, by recognizing this correspondence, the generalization to other types of networks 12 will be clearly apparent to those skilled in the art.

Figure 2A:
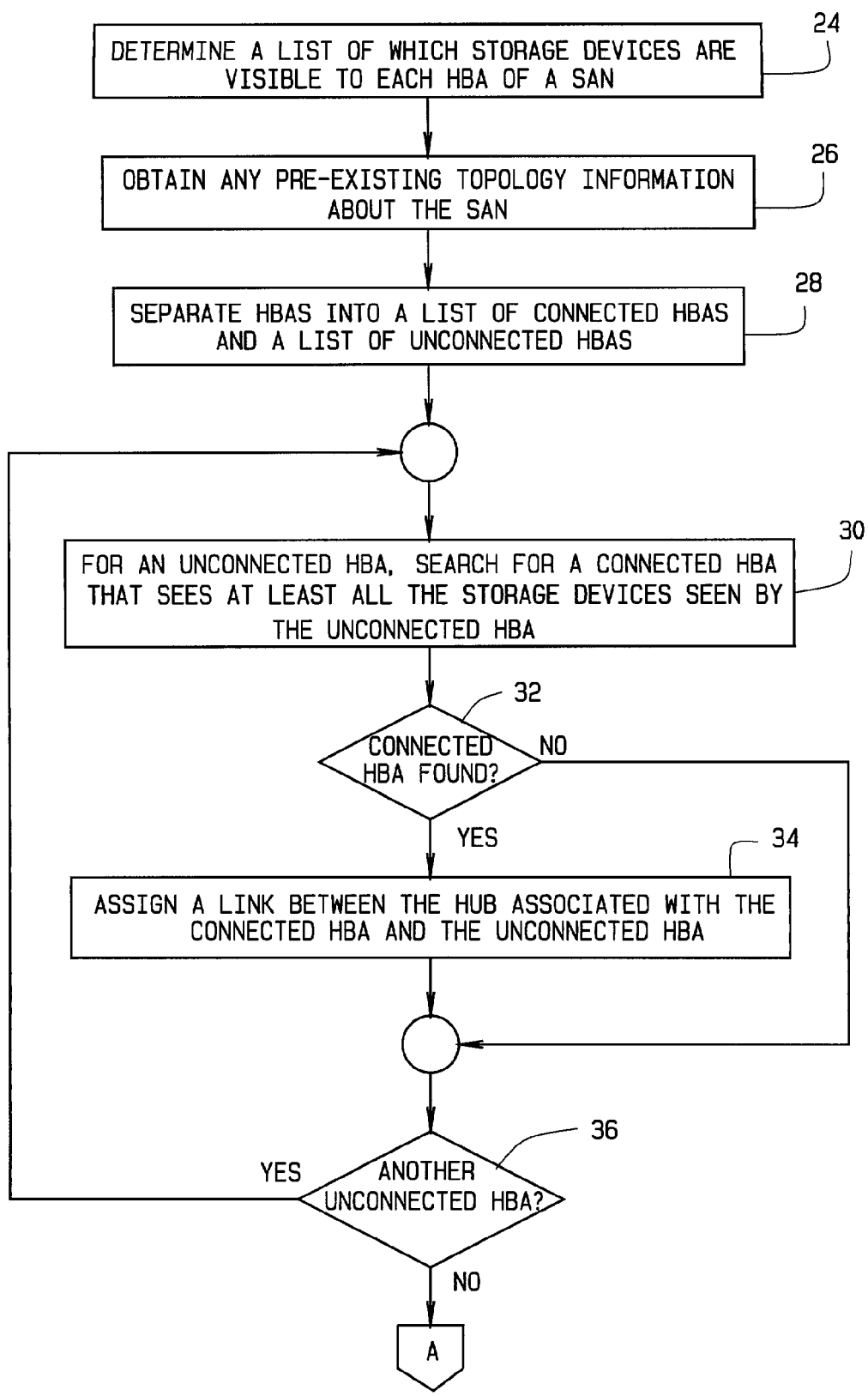
FIG. 2 is a flow chart illustrating one configuration of the present invention.
Figure 2B:
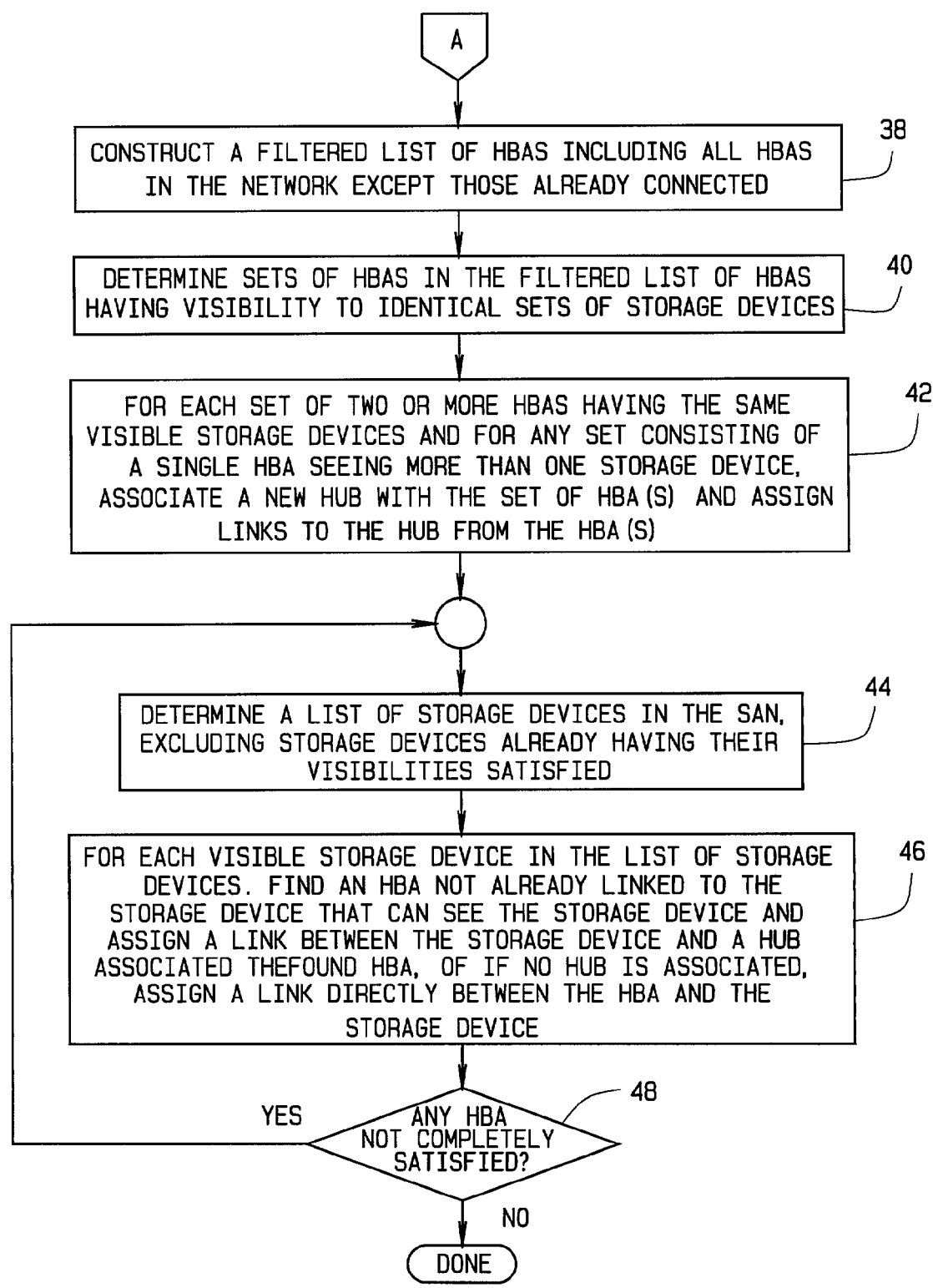

Referring to FIG. 2, in one configuration, SAN manager 10 executes steps of a program to build up a representation, in memory, of the topology of SAN 12. SAN manager 10 determines 24 a list of which storage devices 18 are visible to each HBA 14 of SAN 12. Each storage device is uniquely identifiable, for this purpose, via an identifier unique at least within SAN 12, for example, a manufaacturer's serial number. This list may be determined, for example, from answers obtained by manager 10 querying HBAs 14 (the real, physical kind in network 12, not a representation of an HBA) for such information or by a user obtaining and entering information already known from other sources (such as incomplete network topology maps) directly into manager 10. In addition, any other pre-existing (i.e., already known) topology information is obtained 26 and entered directly into manager 10. In one configuration, topology information is obtained about a subset of HBAs 14 in SAN 12,wherenin each HBA 14 of the subset is a "connected HBA," and each remaining HBA 14 is an "unconnected HBA. "(This distinction is made based upon the information known about HBAs 14 from other sources, not any actually physical differences in SAN 12.)The information about each connected HBAs 14 may include the information that an associated hub 16 is "linked " to one more storage devices 18. ("Linked " refers here to a known cable connection between components.)

In one configuration, the input from steps 24 and 26 is arranged in a memory of manager 10 as a "HashMapOfSets" or a table keyed by an HBA 14 identification The values of the table are the lists of storage device 18 identifications visible to each HBA 14 listed in the table.

Next, a list of all known HBAs 14 in network 12 separated 28 into two lists, one including only connected HBAs 14, and the other including only unconnected HBAs 14. For each unconnected HBA 14, a search 30 is performed for a connected HBA 14 that has visibility to (i.e., can communicate with) every storage device 18 visible to the unconnected HBA 14 under consideration. (it is permissible in this step for the connected HBA to also have visibility to additional storage devices 18.) If a connected HBA 14 meeting this visibility condition is found 32, a link is assigned 34 between the hub 16 associated with the connected HBA 14 and the unconnected HBA14.(It is possible that additional connected HBAs 14 might also meet this condition, but they are ignored in this step.) In one configuration, assignment of this link is performed by following the connection of the connected HBA 14 to either an hub 16 or a storage device 18, creating a representation of a new port on the hub 16 or the storage device 18, and creating a link between the unconnected HBA 14 to the hub 16 or storage device 18 that has the new port. Otherwise, if there is no connected HBA found at 32, assignment 34 of a link is skipped. If 36 there are other unconnected HBAs 14 remaining in the list of unconnected HBAs, execution continues at step 30 for another unconnected HBA 14 in the list.

When all unconnected HBAs have been checked, execution continues by constructing 38 a "filtered" list of HBAs 14 that include all HBAs 14 in SAN 12 except those "already connected." An "already connected" HBA 14 is either a "connected HBA" as in step 28 or an unconnected HBA 14 for which a link was assigned at 34 (and which is now thus an "already connected" HBA). Next, for each HBA 14 in the filtered list of HBAs, sets of HBAs having identical sets of visible storage devices 18 are determined 40. These sets may contain a plurality of HBAs 14, or, for an HBA having a set of visible storage devices different from all other HBAs in the filtered list, only one HBA. (As used herein, the terms "sets of HBAs" and "sets of adapter," without further qualification, are intended to include groups of one or more sets, even if one or more of the sets includes only a single HBA or adapter.)

For each set of two or more HBAs 14 having the same visible storage devices and for any set consisting of a single HBA having visibility to more than one storage device, a new hub 16 is associated 44 with the set of HBAs and links are assigned to new hub from the HBAs in the set. More particularly, in one configuration, an InterconnectDevice representation is created in a memory of SAN manager 10 having sufficient Port represented on one "side " of the InterconnectDevice to represent cable connections between each HBA 14 of the set of HBAs and the InterconnectDevice, and sufficient Ports on the other "side" to represent cable connections between each storage device 18 visible to the set of HBAs 14 and the InterconnectDevice. By "assigning links" between HBAs 14 of the set and hub 16, what is meant in this configuration is that a representation of cable interconnection between the HBAs 14 of the set and the InterconnectDevice is stored in the memory of SAN manager 10. In the case of a set consisting of a single HBA 14 having visibility to more than one storage device, a new hub 16 is associated with the single HBA and a link is assigned from the HBA to the new hub.

In one configuration, there are no sets of HBAs at step 44 having visibility to more than one storage device. Step 44 is then performed only for each set of two or more HBAs having the same visible storage device. If any set of HBAs at step 44 is determined to consist of a signal HBA having visibility to more than one storage device, an indication is provided that the inferred network topology may be incomplete or incorrect. In another configuration, there are no sets of two or more HBAS at steps 44 having the same visible storage devices. In this configuration, step 44 is performed only for each set of HBAs at having visibility to more than one storage device. If any set of HBAs at step 44 in this configuration is determined to consist of two or more HBAs having the same visible storage devices, an indication is provided that the inferred network topology may be incomplete or incorrect.

Next, a list of all storage devices 18 included in network 12 is obtained 44. For example, in one configuration San manager 10 determines members of this list from information made available by network 12 itself. In another configuration, some or all of the list is obtained from externally input network topology data. In configurations in which reliable topology information (for example, the pre-existing topology information at step 26) is available to SAN manager 10 other than that which had to be inferred, storage devices that are already associated with a hub are excluded from this list. For each storage device 18 in the filtered list, an HBA 14 is found 46 that visibility to the storage device. A link is assigned between the storage device 18 under consideration and a hub 16 already associated with the found HBA 14, or if there is no hub 16 associated with the found HBA 14, a link is assigned directly between the found HBA and the storage device 18. (In one configuration, pre-existing topology information is also used to find ports 23 linked to HBAs 14 from which storage device 18 is visible.)

If, at this point, there remain any HBAs 14 that have not be completely "satisfied," i.e., an HBA is known to have a storage device visible that has not been linked to it in any of the preceding steps either directly or indirectly (i.e., via a hub 16), execution continues at step 44. Otherwise, a result is obtained that is an inferred mapping of a network 12 topology in a memory of SAN manager 10. The inferred topology is either the same as the correct topology, or is at least sufficiently accurate for proper control of SAN network 12 by SAN manager 10.

In one configuration of the present invention, pre-existing topology information about the SAN is not used. In this configuration, steps 26, 28, 30, 32, 34, 36, and 38 are omitted from the method, and the "filtered" list of HBAs in step 40 is simply a list of all known HBAs in the network.

In another configuration of the present invention, network 12 is not a SAN, and devices 14, 1, and 18 are, respectively, adapters, interconnect devices, and non-interconnect devices.

In one configuration, steps described above are performed by network controller or manager 10, which is a computing apparatus comprising a processor 204 operatively coupled to a memory 206 in which the links, interconnect devices, adapters, and non-interconnect devices referred to in the method steps are represented, and in which the various lists are stored. Processor 204 is also coupled to HBAs 14 in controller 10. (Although not shown, each host 22 may also contain a processor coupled to a memory and to HBAs 14 in the host.) Processor 204, and thus controller 10, are configured to perform the steps described above utilizing a stored program. In one configuration, the stored program supplied on a medium or media 200 (e.g., a floppy diskette or CD-ROM) that contains machine readable instructions configured to instruct processor 204, and thus controller 10, to perform the steps described above. The machine readable instructions may also be stored in a memory of controller 10, in one or more storage devices 18 in network 12, or received electronically or optically via an external network. The choice of a suitable memory for each purpose, such as random access memory, a hard disk drive, etc., is a design choice that may be made by one of ordinary skill in the art.

Figure 3:
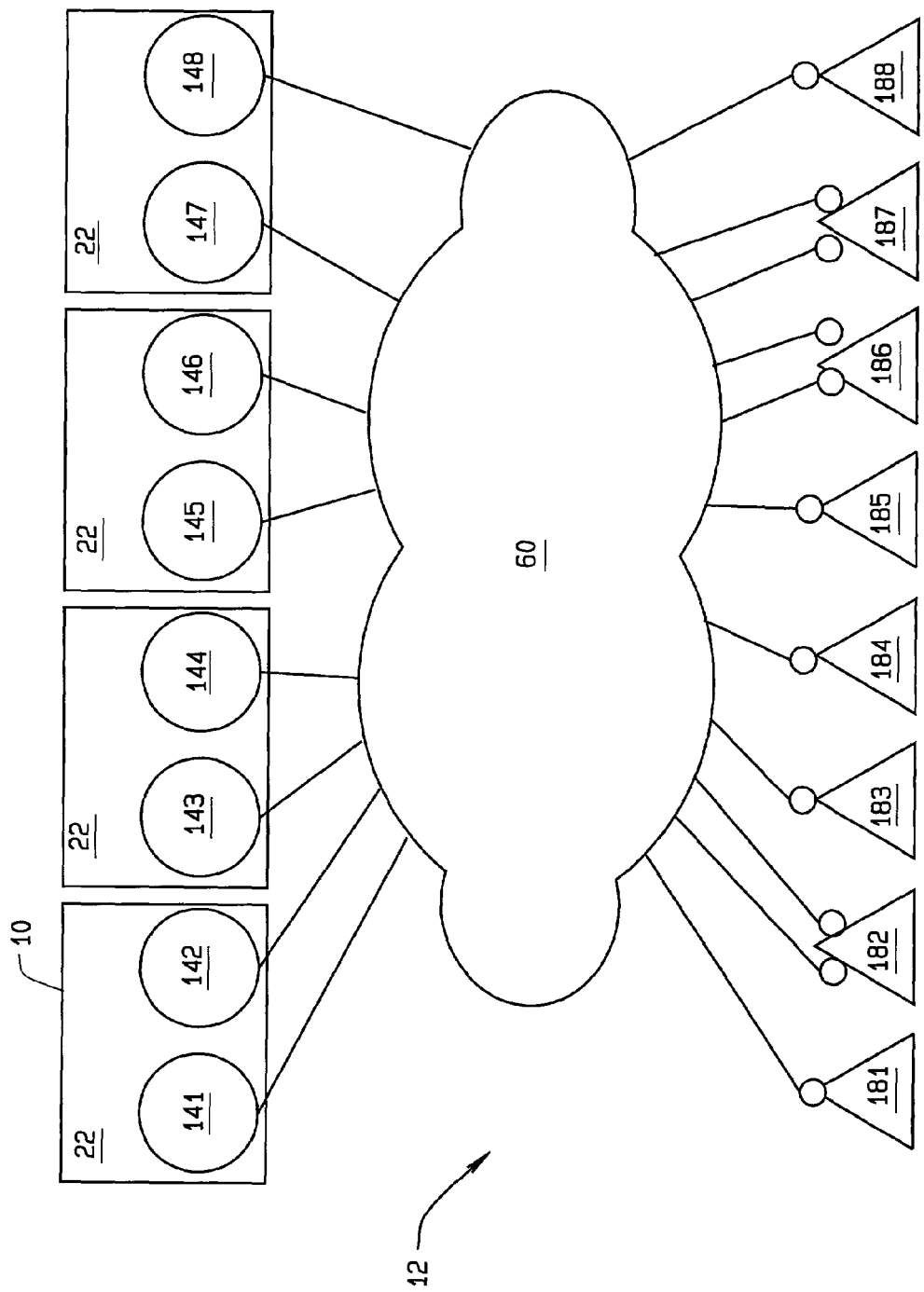
FIG. 3 is a representation of a storage area network having a topology to be inferred utilizing configuration of the present invention.

Referring to the sample SAN network 12 represented in FIG. 3 (the topology of which is not fully known) and to the flow diagram of FIG. 2, one configuration of the present invention is described that infers a topology of interconnections 50 between HBAs 141, 142, 143, 144, 145, 146, 147, and 148 and storage devices 181, 182, 183, 184, 185, 186, 187, and 188 of sample SAN network 12 of FIG. 3. A stored program of computer instructions instructs SAN manager 10 to perform the steps described herein.

A list of which storage devices are visible to each HBA 141, 142, 143, 144, 145, 146, 147, and 148 of SAN 12 is determined 24. This list is shown in Table I below. Information from this list is obtained, in one configuration, by SAN manager 10 querying each known or discoverable HBA. In this example, the stored program in SAN manager 10 communicates with HBAs 143, 144, 145, 146, 147 and 148 via an external network (not shown) and, in case of HBAs 141 and 142, directly via manager 10. The results returned from the queries are indicative of device visibility, i.e., those storage devices 181, 182, 183, 184, 185, 186, 187, or 188 that each HBA can communicate with via network 12. For example, network 12 is a fibre channel network, and each HBA 141, 142, 143, 144, 145, 146, 147, and 148 communicates with (not necessarily different) sets of one or more of storage devices 181, 182, 183, 184, 185, 186, 187, or 188.

TABLE I

| HBA number | Has visibility to these storage devices |
|---|---|
| 141 | 181, 182, 183 |
| 142 | 182, 183 |
| 143 | 181, 182, 183 |
| 144 | 184, 185, 186 |
| 145 | 184, 185, 186 |
| 146 | 182, 186, 187 |
| 147 | 187 |
| 148 | 188 |

In addition, an incomplete map of SAN 12 is available with some reliable information about a subset of SAN 12. From this map, pre-existing topology information is obtained 26. This topology information indicates, in this example, that HBA 141 is connected to a port 23 on a hub 161 (not shown in FIG. 3) and that storage devices 181, 182, and 183 are connected to other ports 23 of hub 161. In addition, it is known that HBA 148 is directly connected via a cable to storage device 188.

A data structure ("HashMapOfSets") is created in a memory of SAN manager 10 using the stored program of computer instructions. SAN manager 10. This structure represents the device visibility listed in Table I. The use of a data structure such as a "HashMapOfSets" that is indexed by HBA and that has a list of values representing visible storage devices for each indexed HBA simplifies the stored program particularly when larger network topologies are inferred.

Next, the list in Table I is separated 28 into two lists, one containing connected HBAs and the other containing unconnected HBAs. The "connected" HBAs are those for which pre-existing topology information is available, and thus includes HBAs 141 and 148. HBAs 142, 143, 144, 145, 146, and 147 are placed in the list of "unconnected" HBAs.

Figure 4:
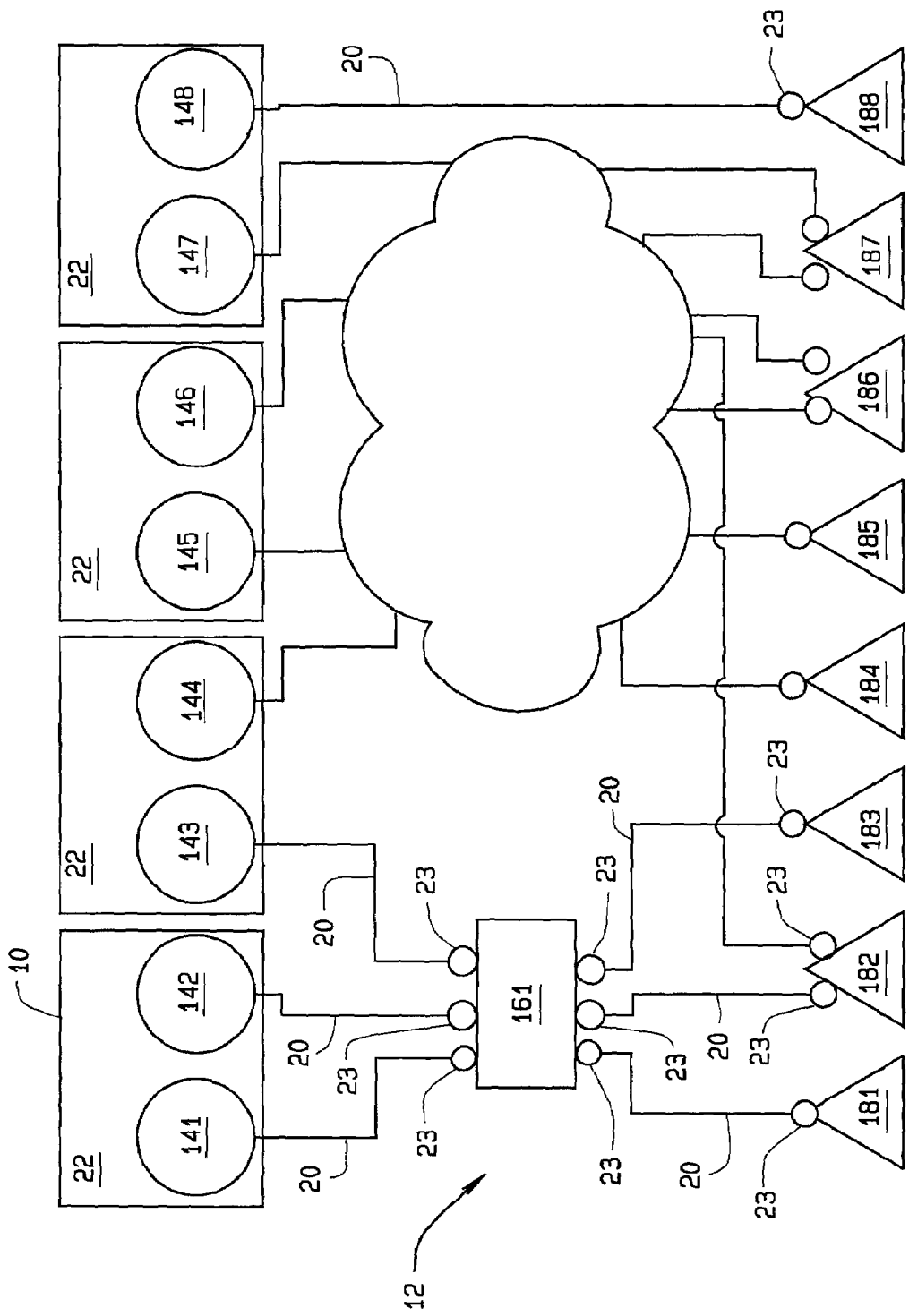
FIG. 4 is a representation of a partially inferred topology of the network of FIG. 3.

For each unconnected HBA, a search 30 is performed to find a connected HBA having visibility to every storage device visible to the unconnected HBA. Thus, a search for HBA 142 finds 32 a match with HBA 141. (Although not the case in this example, it is possible that more than one match exists, in which case only one match is used and the others ignored.) A link 20 is thus assigned 34 between hub 161 (not shown in FIG. 3) and HBA 142. A check 36 is performed to determine whether there are other unconnected HBAs, and that being the case, the search is repeated for these other HBAs. Thus, a link 20 is also assigned between HBA 143 and hub 161. No other links 20 are assigned in this example. The resulting network topology represented thus far in SAN manager 10 is shown in FIG. 4. (Note that storage device 182 is not visible to HBA 142, but this may be in accordance with the original design of SAN 12 rather than a network problem or topology anomaly. Ports 23 shown in FIG. 4 are readily inferred from the fact that all interconnections to hubs and storage devices are via ports.)

In the method configuration described herein, and for which partial results are illustrated in FIG. 4, links have already been assigned between hub 161 and storage devices 181, 182, and 183, and between HBA 148 and storage device 188. These links are already assigned because they are known from the pre-existing topology information. However, in another configuration, the assignment of the links is deferred until step 46 of FIG. 2 is performed.

Figure 5:
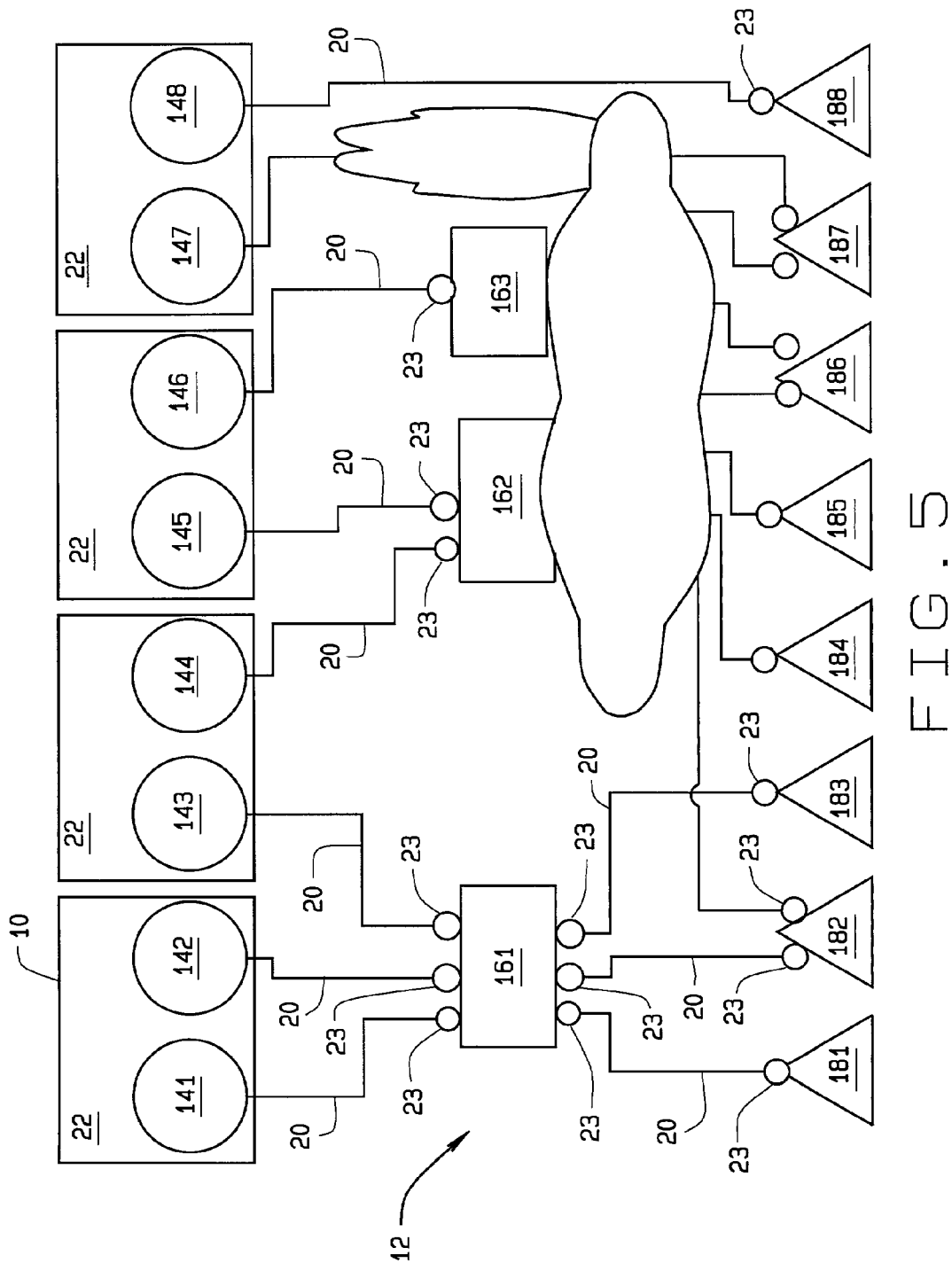
FIG. 5 is a representation of a more completely inferred reconstructed topology of the network of FIG. 3.

Next, a filtered list of HBAs 38 is constructed. This list excludes HBAs that are already connected in the inferred network topology, namely, HBAs 141, 142, 143 and 148 are excluded. Thus, the filtered list includes only HBAs 144, 145, 146 and 147. Of the HBAs in the filtered list, only HBAs 144 and 145 have visibility to an identical set of storage devices. Thus, HBAs 144 and 145 form a set for purposes of step 40. In addition, HBAs 146 and 147 each form a set by themselves with only one HBA as a member of the set. Because only the set having HBAs 144 and 145 has more than one member, and referring to FIG. 5, a new hub 162 is associated with the set of HBAs 144 and 145, and links 20 are assigned between HBA 144 and hub 162, and between HBA 145 and hub 162. In addition, HBA 146 has visibility to storage devices 182, 186, and 187, and is the only HBA in its set. Therefore, a new hub 163 is associated with HBA 146 and a link 20 is assigned between HBA 146 and hub 163.

Figure 6:
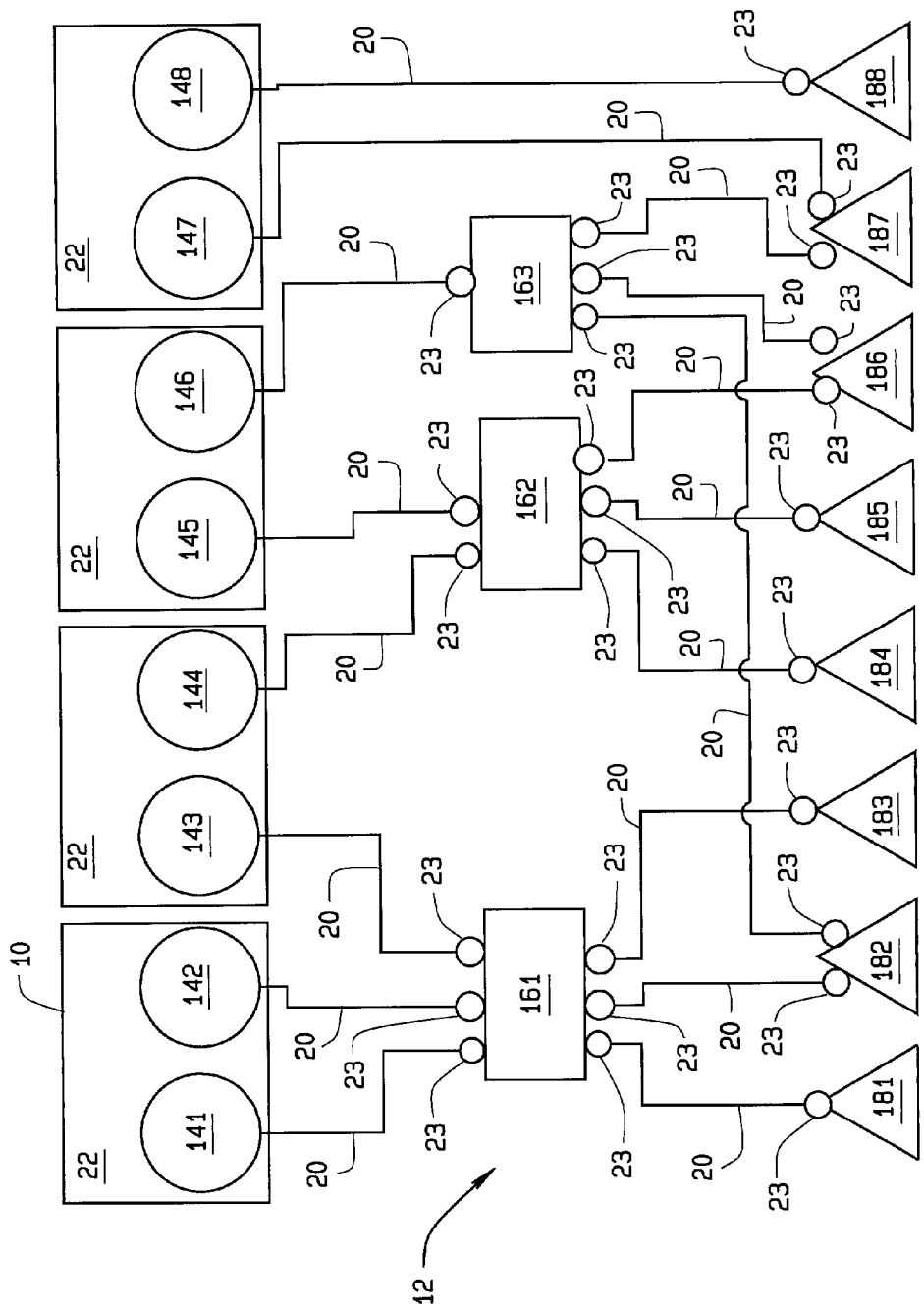
FIG. 6 is a representation of a completely inferred reconstructed topology of the network of FIG. 3.

The only storage devices in the SAN that can be determined 44 to not already have their visibilities satisfied (see Table I and FIG. 5) are storage devices 182, 184, 185, 186, and 187. (Note that storage devices 184, 185, and 186 were not yet linked to hub 162 in step 42, and the additional visibility of storage device 182 has not been satisfied yet.) Next, and referring to FIG. 2 and FIG. 6, for each visible storage device in the list of storage devices (all are visible in this example), an HBA is found 46 that is not already linked to the storage device, but which has visibility to the storage device. A link 20 is assigned between the storage device and a hub associated with the found HBA, or if no hub is assigned, a link 20 is assigned directly between the HBA and the storage device.

Thus, for storage device 182, the only HBA that has visibility to storage device 182 and that is not already linked to storage device 182 is HBA 146. Therefore, a link 20 is assigned between storage device 182 and hub 163. Similarly, links 20 are assigned between storage device 184 and hub 162, between storage device 185 and hub 162, and storage device 186 and hub 162. Storage device 187 is visible to HBA 146, to which hub 163 is associated. Therefore, a link 20 is assigned between storage device 187 and hub 163. At this point, insufficient links 20 are assigned to satisfy 48 the entire visibility of storage devices to HBAs 146 and 147. Therefore, another list of storage devices is determined 44 that have not had all visibilities satisfied. This list includes storage devices 186 and 187. Storage device 186 is visible to HBA 146, to which hub 163 is associated. Therefore, a link 20 is assigned between hub 163 and storage device 186. Also, storage device 187 is visible to HBA 147. Because no hub is associated with HBA 147, a link 20 is assigned directly between HBA 147 and storage device 187. The result is the representation of a complete network 10 shown in FIG. 6 in the memory of SAN manager 10.

It will thus be seen that configurations of the present invention are useful in inferring the topology of a network, such as a storage area network, for which limited or no pre-existing topology information is available. This information can be utilized, for example, by a SAN management system to control a storage area network, or it may be displayed for other purposes, such as for network troubleshooting. Moreover, some configurations of the present invention permit network configurations to be inferred without requiring users to manually enter information about the network.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for inferring topology in a network, said method comprising:
   (a) determining which non-interconnect devices are visible to each adapter in the network;
   (b) obtaining pre-existing topology information about connected adapters in the network, separating adapters into a list of the connected adapters and a list of unconnected adapters, and linking each connected adapter to an associated interconnect device, wherein said unconnected adapters comprise adapters for which no pre-existing topology information is available that specifies to which interconnect devices such unconnected adapters are connected;
   (c) for each unconnected adapter, searching for a connected adapter having visibility to every said non-interconnect device visible to the unconnected adapter, and when said searching is successful, assigning a link between the interconnect device associated with the connected adapter and the unconnected adapter;
   (d) obtaining a list of non-interconnect devices in the network excluding non-interconnect devices already having completely satisfied visibilities;
   (e) for each non-interconnect device in the list, finding an adapter not already linked to the non-interconnect device that has visibility to the non-interconnect device, and assigning a link between the non-interconnect device and an interconnect device assigned to the found adapter or directly between the found adapter and the non-interconnect device; and
   (f) iterating steps (d) and (e) until visibility of each adapter is satisfied.

2. A method in accordance with claim 1 further comprising:
   constructing a filtered list of adapters including all adapters except connected adapters and unconnected adapters that have been assigned a link to an interconnect device associated with a connected adapter, wherein steps (b), (c), (d), (e) and (f) are performed only for adapters in the filtered list of adapters.

3. A method in accordance with claim 2 wherein the network is a storage area network (SAN), the non-interconnect devices are storage devices, and the adapters are host bus adapters (HBAs).

4. A method in accordance with claim 3 wherein obtaining topology information about a subset of the adapters in the network comprises a storage area network controller querying the HBAs for said topology information.

5. A method in accordance with claim 1 wherein the network is a storage area network (SAN), the non-interconnect devices are storage devices, and the adapters are host bus adapters (HBAs).

6. A method in accordance with claim 1 further comprising representing each interconnect device linked to more than one adapter, to more than one non-interconnect device, or to more than one adapter and more than one non-interconnect device as one of either a switch or a hub having a plurality of ports, each port linked either to a different said associated adapter or to a different said associated non-interconnect device.

7. A method in accordance with claim 6 further comprising representing each interconnect device linked to only one adapter and one non-interconnect device and the links thereto as a single cable.

8. A method for inferring topology in a network, said method comprising:
   (a) determining which non-interconnect devices are visible to each adapter in the network;
   (b) identifying adapters that are not linked to an interconnect device;
   (c) identifying an adapter linked to an interconnect device that has visibility to at least all of non-interconnect devices seen by a given adapter that is not linked to an interconnect device and forming a link between the given adapter and the interconnect device;
   (d) obtaining a list of non-interconnect devices in the network excluding non-interconnect devices already having completely satisfied visibilities;
   (e) for each non-interconnect device in the list, finding an adapter not already linked to the non-interconnect device that has visibility to the non-interconnect device, and assigning a link between the non-interconnect device and an interconnect device assigned to the found adapter or directly between the found adapter and the non-interconnect device; and
   (f) iterating steps (d) and (e) until visibility of each adapter is satisfied.

9. A computing apparatus for inferring topology in a network having interconnected adapters, interconnect devices, and non-interconnect devices, said apparatus comprising a processor and an operatively coupled memory, said apparatus configured to:
   (a) determine which non-interconnect devices are visible to each adapter in the network;
   (b) determine sets of one or more adapters having visibility to identical sets of said one or more non-interconnect devices;
   (c) for each set of said sets of adapters that has more than one adapter, associate an interconnect device to said set having more than one adapter and assign links to the associated interconnect device from said more than one adapter;
   (d) obtain a list of non-interconnect devices in the network excluding non-interconnect devices already having completely satisfied visibilities;
   (e) for each non-interconnect device in the list, find an adapter not already linked to the non-interconnect device that has visibility to the non-interconnect device, and assign a link between the non-interconnect device and an interconnect device assigned to the found adapter or directly between the found adapter and the non-interconnect device; and
   (f) iterate (d) and (e) until visibility of each adapter is satisfied.

10. An apparatus in accordance with claim 9 further configured to:
    recognize at (c) that at least one set of said sets of adapters consists of a single adapter having visibility to more than one non-interconnect device; and
    indicate that a resulting inferred topology result may be incorrect or incomplete.

11. An apparatus in accordance with claim 9, further configured to:
    for each set of said sets of adapters at (c) that consists of a single adapter having visibility to more than one non-interconnect device, associate an interconnect device to said single adapter and assign a link from said single adapter to the associated interconnect device.

12. An apparatus in accordance with claim 11 further configured to:

obtain pre-existing topology information about connected adapters in the network;

separate adapters into a list of the connected adapters and a list of unconnected adapters, and link each connected adapter to an associated interconnect device;

for each unconnected adapter, search for a connected adapter having visibility to every said non-interconnect device visible to the unconnected adapter, and when said searching is successful, assign a link between the interconnect device associated with the connected adapter and the unconnected adapter; and construct a filtered list of adapters including all adapters except connected adapters and unconnected adapters that have been assigned a link to an interconnect device associated with a connected adapter, wherein said apparatus is configured to perform (b), (c), (d) (e) and (f) only for adapters in the filtered list of adapters.

13. An apparatus in accordance with claim 12 wherein the network is a storage area network (SAN), the non-interconnect devices are storage devices, and the adapters are host bus adapters (HBAs), and to obtain topology information about a subset of the adapters in the network, said apparatus is configured to query the HBAs for said topology information.

14. An apparatus in accordance with claim 11 wherein said apparatus is further configured to represent each interconnect device linked to more than one adapter, to more than one non-interconnect device, or to more than one adapter and more than one non-interconnect device as one of either a switch or a hub having a plurality of ports, each port linked either to a different said associated adapter or to a different said associated non-interconnect device.

15. An apparatus in accordance with claim 14 further configured to represent each interconnect device linked to only one adapter and one non-interconnect device and the links thereto as a single cable.

16. A computing apparatus for inferring topology in a network having interconnected adapters, interconnect devices, and non-interconnect devices, said apparatus comprising a processor and an operatively coupled memory, said apparatus configured to:

(a) determine which non-interconnect devices are visible to each adapter in the network;

(b) obtaining pre-existing topology information about connected adapters in the network, separating adapters into a list of the connected adapters and a list of unconnected adapters, and linking each connected adapter to an associated interconnect device;

(c) for each unconnected adapter, searching for a connected adapter having visibility to every said non-interconnect device visible to the unconnected adapter, and when said searching is successful, assigning a link between the interconnect device associated with the connected adapter and the unconnected adapter;

(d) obtain a list of non-interconnect devices in the network excluding non-interconnect devices already having completely satisfied visibilities;

(e) for each non-interconnect device in the list, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

17. A machine readable medium or media having recorded thereon instructions configured to instruct a computing apparatus having a processor and an operatively coupled memory to:

(a) determine which non-interconnect devices are visible to each adapter in the network;

(b) determine sets of one or more adapters having visibility to identical sets of one or more non-interconnect devices;

(c) for each set of said sets of adapters that has more than one adapter, associate an interconnect device to said set having more than one adapter and assign links to the associated interconnect device from said more than one adapter;

(d) obtain a list of non-interconnect devices in the network excluding non-interconnect devices already having completely satisfied visibilities;

(e) for each non-interconnect device in the list, find an adapter not already linked to the non-interconnect device that has visibility to the non-interconnect device, and assign a link between the non-interconnect device and an interconnect device assigned to the found adapter or directly between the found adapter and the non-interconnect device; and (f) iterate (d) and (e) until visibility of each adapter is satisfied.

18. A medium or media in accordance with claim 17 further having recorded thereon instructions configured to instruct the computing apparatus to:

recognize at (c) that at least one set of said sets of adapters consists of a single adapter having visibility to more than one non-interconnect device; and indicate that a resulting inferred topology result may be incorrect or incomplete.

19. A medium or media in accordance with claim 17 further having recorded thereon instructions configured to instruct the computing apparatus to:

for each set of said sets of adapters at (c) that consists of a single adapter having visibility to more than one non-interconnect device, associate an interconnect device to said single adapter and assign a link from said single adapter to the associated interconnect device.

20. A medium or media in accordance with claim 19 further having recorded thereon instructions configured to instruct the computing apparatus to:

obtain pre-existing topology information about connected adapters in the network;

separate adapters into a list of the connected adapters and a list of unconnected adapters, and link each connected adapter to an associated interconnect device and the associated interconnect device is linked to a set of known non-interconnect devices;

for each unconnected adapter, search for a connected adapter having visibility to every said non-interconnect device visible to the unconnected adapter, and when said searching is successful, assign a link between the interconnect device associated with the connected adapter and the unconnected adapter; and construct a filtered list of adapters including all adapters except connected adapters and unconnected adapters that have been assigned a link to an interconnect device associated with a connected adapter, wherein said apparatus is configured to perform (b), (c), (d) (e) and (f) only for adapters in the filtered list of adapters.

21. A medium or media in accordance with claim 20 wherein the network is a storage area network (SAN), the non-interconnect devices are storage devices, and the adapters are host bus adapters (HBAs), and to obtain topology information about a subset of the adapters in the network, said medium or media further has recorded thereon instructions configured to instruct the computing apparatus to query the HBAs for said topology information.

22. An medium or media in accordance with claim 19 wherein said medium or media further have recorded thereon instructions configured to instruct the computing apparatus to represent each interconnect device linked to more than one adapter, to more than one non-interconnect device, or to more than one adapter and more than one non-interconnect device as one of either a switch or a hub having a plurality of ports, each port linked either to a different said associated adapter or to a different said associated non-interconnect device.

23. A medium or media in accordance with claim 22 further having recorded thereon instructions configured to instruct the computing apparatus to represent each interconnect device linked to only one adapter and one non-interconnect device and the links thereto as a single cable.

24. A machine readable medium or media having recorded thereon instructions configured to instruct a computing apparatus having a processor and an operatively coupled memory to:
   (a) determine which non-interconnect devices are visible to each adapter in the network;
   (b) identifying adapters that are not linked to an interconnect device;
   (c) identifying an adapter linked to an interconnect device that has visibility to at least all of non-interconnect devices seen by a given adapter that is not linked to an interconnect device and forming a link between the given adapter and the interconnect device;
   (d) obtain a list of non-interconnect devices in the network excluding non-interconnect devices already having completely satisfied visibilities;
   (e) for each non-interconnect device in the list, find an adapter not already linked to the non-interconnect device that has visibility to the non-interconnect device, and assign a link between the non-interconnect device and an interconnect device assigned to the found adapter or directly between the found adapter and the non-interconnect device; and
   (f) iterate (d) and (e) until visibility of each adapter is satisfied.

25. A computing apparatus for inferring topology in a network having interconnected adapters, interconnect devices, and non-interconnect devices, said apparatus comprising:
   (a) means for determining which non-interconnect devices are visible to each adapter in the network;
   (b) means for determining sets of one or more adapters having visibility to identical sets of one or more non-interconnect devices;
   (c) means for associating an interconnect device to said set having more than one adapter and for assigning links to the associated interconnect device from said more than one adapter for each set of said sets of adapters that has more than one adapter;
   (d) means for obtaining a list of non-interconnect devices in the network excluding non-interconnect devices already having completely satisfied visibilities;
   (e) means for finding an adapter not already linked to the non-interconnect device that has visibility to the non-interconnect device, and for assigning a link between the non-interconnect device and an interconnect device assigned to the found adapter or directly between the found adapter and the non-interconnect device, for each visible non-interconnect device in the list of all non-interconnect devices, and
   (f) means for iterating functions performed by means (d) and (e) until visibility of each adapter is satisfied;
   (g) means for obtaining pre-existing topology information about connected adapters in the network;
   (h) means for separating adapters into a list of the connected adapters and a list of unconnected adapters, and for linking each connected adapter to an associated interconnect device; and
   (i) means for searching for a connected adapter having visibility to every said non-interconnect device visible to the unconnected adapter, and when said searching is successful, for assigning a link between the interconnect device associated with the connected adapter and the unconnected adapter, for each unconnected adapter.

26. An apparatus in accordance with claim 25 further comprising:
   means for recognizing at (c) that at least one set of said sets of adapters consists of a single adapter having visibility to more than one non-interconnect device; and
   means for indicating that a resulting inferred topology result may be incorrect or incomplete.

27. An apparatus in accordance with claim 25, further comprising:
   means for associating an interconnect device to said single adapter and for assigning a link from said single adapter to the associated interconnect device for each set of said sets of adapters at (c) that consists of a single adapter having visibility to more than one non-interconnect device.

28. An apparatus in accordance with claim 27 further comprising:
   means for constructing a filtered list of adapters including all adapters except connected adapters and unconnected adapters that have been assigned a link to an interconnect device associated with a connected adapter, wherein said apparatus is configured to perform functions performed by means (b), (c), (d) (e) and (f) only for adapters in the filtered list of adapters.

29. An apparatus in accordance with claim 25 wherein the network is a storage area network (SAN), the non-interconnect devices are storage devices, and the adapters are host bus adapters (HBAs), and to obtain topology information about a subset of the adapters in the network, and said apparatus further comprises means for querying the HBAs for said topology information.

30. A computing apparatus for inferring topology in a network having interconnected adapters, interconnect devices, and non-interconnect devices, said apparatus comprising:
   (a) means for determining which non-interconnect devices are visible to each adapter in the network;
   (b) means for identifying adapters that are not linked to an interconnect device;
   (c) means for identifying an adapter linked to an interconnect device that has visibility to at least all of non-interconnect devices seen by a given adapter that is not linked to an interconnect device and forming a link between the given adapter and the interconnect device;

(d) means for obtaining a list of non-interconnect devices in the network excluding non-interconnect devices already having completely satisfied visibilities;

(e) means for finding an adapter not already linked to the non-interconnect device that has visibility to the non-interconnect device, and for assigning a link between the non-interconnect device and an interconnect device assigned to the found adapter or directly between the found adapter and the non-interconnect device, for each visible non-interconnect device in the list of all non-interconnect devices; and (f) means for iterating functions performed by means (d) and (e) until visibility of each adapter is satisfied.

* * * * *